(12) United States Patent
Rosensweig et al.

(10) Patent No.: US 9,203,705 B2
(45) Date of Patent: Dec. 1, 2015

(54) ALLOCATION OF RESOURCES BASED ON CONSTRAINTS AND CONFLICTING GOALS

(71) Applicants: Elisha J. Rosensweig, Petach Tikvah (IL); Sharon Mendel, Petach Tikvah (IL); Dmitri Krasnenko, Tel Aviv (IL); Etti Shalev, Kfar-Saba (IL)

(72) Inventors: Elisha J. Rosensweig, Petach Tikvah (IL); Sharon Mendel, Petach Tikvah (IL); Dmitri Krasnenko, Tel Aviv (IL); Etti Shalev, Kfar-Saba (IL)

(73) Assignee: Alcatel Lucent, Boulogne-Billancourt (FR)

( * ) Notice: Subject to any disclaimer, the term of this patent is extended or adjusted under 35 U.S.C. 154(b) by 366 days.

(21) Appl. No.: 13/779,920

(22) Filed: Feb. 28, 2013

(65) Prior Publication Data

US 2014/0244842 A1    Aug. 28, 2014

(51) Int. Cl.
*H04L 12/24*      (2006.01)
*G06F 9/50*       (2006.01)
*H04L 29/08*      (2006.01)

(52) U.S. Cl.
CPC ............... *H04L 41/18* (2013.01); *G06F 9/5072* (2013.01); *H04L 41/0896* (2013.01); *H04L 67/10* (2013.01); *G06F 2209/506* (2013.01); *H04L 41/5096* (2013.01)

(58) Field of Classification Search
None
See application file for complete search history.

(56) References Cited

U.S. PATENT DOCUMENTS

| | | | | |
|---|---|---|---|---|
| 6,115,390 A * | 9/2000 | Chuah | ............................ | 370/443 |
| 7,242,668 B2 * | 7/2007 | Kan et al. | ....................... | 370/234 |
| 7,792,942 B1 * | 9/2010 | Regan et al. | .................. | 709/223 |
| 8,045,539 B2 * | 10/2011 | Hassan-Ali et al. | .......... | 370/352 |
| 8,493,870 B2 * | 7/2013 | Calippe et al. | ................ | 370/242 |
| 8,520,559 B2 * | 8/2013 | Rao et al. | ....................... | 370/279 |
| 8,542,576 B2 * | 9/2013 | Ortega et al. | ................. | 370/216 |
| 8,559,336 B2 * | 10/2013 | Calippe et al. | ................ | 370/254 |
| 8,767,584 B2 * | 7/2014 | Calippe et al. | ................ | 370/254 |
| 8,861,494 B2 * | 10/2014 | Mukhopadhyay | ............ | 370/338 |
| 8,868,029 B2 * | 10/2014 | Shu et al. | ....................... | 455/405 |
| 2002/0089985 A1 * | 7/2002 | Wahl et al. | ................. | 370/395.1 |
| 2005/0018665 A1 * | 1/2005 | Jordan et al. | .................. | 370/388 |
| 2009/0043894 A1 * | 2/2009 | Goderis et al. | ................ | 709/226 |

\* cited by examiner

*Primary Examiner* — Ranodhi Serrao
(74) *Attorney, Agent, or Firm* — Wall & Tong, LLP

(57) ABSTRACT

A goal evaluation capability is provided. A resource allocation request of a customer is received. The resource allocation request includes a request for allocation of resources of a distributed system of a provider, a set of customer constraints, and a customer goal. A set of feasible resource allocations for the customer is determined based on the set of customer constraints and on information associated with the distributed system. The set of feasible resource allocations includes a plurality of feasible resource allocations. A provider goal function associated with a provider goal of the provider is determined. A customer goal function associated with the customer goal of the customer is determined. A feasible resource allocation is selected for the customer, from the set of feasible resource allocations, based on the provider goal function and the customer goal function.

18 Claims, 6 Drawing Sheets

US 9,203,705 B2

ALLOCATION OF RESOURCES BASED ON CONSTRAINTS AND CONFLICTING GOALS

TECHNICAL FIELD

The disclosure relates generally to networks and, more specifically but not exclusively, to allocation of resources in distributed networks.

BACKGROUND

While traditionally cloud operators host cloud services using centralized cloud systems, some cloud operators are beginning to provide cloud services using distributed cloud systems. A centralized cloud system typically consists of less data centers than a distributed cloud system, while the data centers of a centralized cloud system are typically larger than the data centers of a distributed cloud system (e.g., in terms of computing power, storage, and the like). The deployment of a distributed cloud system, as opposed to a centralized cloud system, may be economically feasible for some service providers, such as for service providers that already have existing facilities distributed across wide areas (e.g., Central Offices of network providers that already have a large base of existing infrastructure).

In such centralized cloud systems, a requester may request the use of one or more resources from a cloud operator and the cloud operator may then allocate the requested resources from one of the data centers for use by the requestor. The use of a centralized cloud system, however, while suitable for exploiting the economic benefit of large scales, tends to introduce limitations such as increased latency experienced by users and potential reliability issues. The use of a distributed cloud system, as opposed to a centralized cloud system, may reduce the latency experienced by users. However, allocation of resources to a requester in a distributed cloud system is generally more complicated than allocation of resources to a requester in a centralized cloud system, due to several factors including the need to select a suitable location to deploy each component of a customer application in the distributed cloud.

SUMMARY OF EMBODIMENTS

Various deficiencies in the prior art may be addressed by embodiments for supporting allocation of resources in a distributed network with conflicting optimization goals.

In one embodiment, an apparatus includes a processor and a memory communicatively connected to the processor. The processor is configured to receive a resource allocation request of a customer, where the resource allocation request includes a request for allocation of resources of a distributed system of a provider, a set of customer constraints, and a customer goal. The processor is configured to determine a set of feasible resource allocations for the customer based on the set of customer constraints and on information associated with the distributed system, where the set of feasible resource allocations includes a plurality of feasible resource allocations. The processor is configured to determine a provider goal function associated with a provider goal of the provider and to determine a customer goal function associated with the customer goal of the customer. The processor is configured to select a feasible resource allocation for the customer from the set of feasible resource allocations based on the provider goal function and the customer goal function.

In one embodiment, a method includes using a processor to select a feasible resource allocation for a customer. The method includes receiving a resource allocation request of a customer, where the resource allocation request includes a request for allocation of resources of a distributed system of a provider, a set of customer constraints, and a customer goal. The method includes determining a set of feasible resource allocations for the customer based on the set of customer constraints and on information associated with the distributed system, where the set of feasible resource allocations includes a plurality of feasible resource allocations. The method includes determining a provider goal function associated with a provider goal of the provider and determining a customer goal function associated with the customer goal of the customer. The method includes selecting a feasible resource allocation for the customer from the set of feasible resource allocations based on the provider goal function and the customer goal function.

In one embodiment, a computer-readable storage medium stores instructions which, when executed by a computer, cause the computer to perform a method for selecting a feasible resource allocation for a customer. The method includes receiving a resource allocation request of a customer, where the resource allocation request includes a request for allocation of resources of a distributed system of a provider, a set of customer constraints, and a customer goal. The method includes determining a set of feasible resource allocations for the customer based on the set of customer constraints and on information associated with the distributed system, where the set of feasible resource allocations includes a plurality of feasible resource allocations. The method includes determining a provider goal function associated with a provider goal of the provider and determining a customer goal function associated with the customer goal of the customer. The method includes selecting a feasible resource allocation for the customer from the set of feasible resource allocations based on the provider goal function and the customer goal function.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EMBODIMENTS

In general, a goal evaluation capability is provided herein. In at least some embodiments, when a customer makes a request to a provider and the request has one or more customer constraints associated therewith, the provider may determine handling of the request in a manner for satisfying the customer constraints as well as for satisfying (or at least attempting to satisfy) at least one of a goal of the customer associated with the request and a goal of the provider in accommodating the request. In at least some embodiments, a resource allocation request by a customer to a distributed cloud provider of a distributed cloud system is processed, for determining a resource allocation for the customer in the distributed cloud system, in a manner for satisfying (or at least attempting to satisfy) at least one of a goal of the customer and a goal of the distributed cloud provider. It will be appreciated that, although primarily depicted and described with respect to use of the goal evaluation capability within the context of a specific type of system (namely, a distributed cloud system), the goal evaluation capability also may be used within the context of other suitable types of systems.

Figure 1:
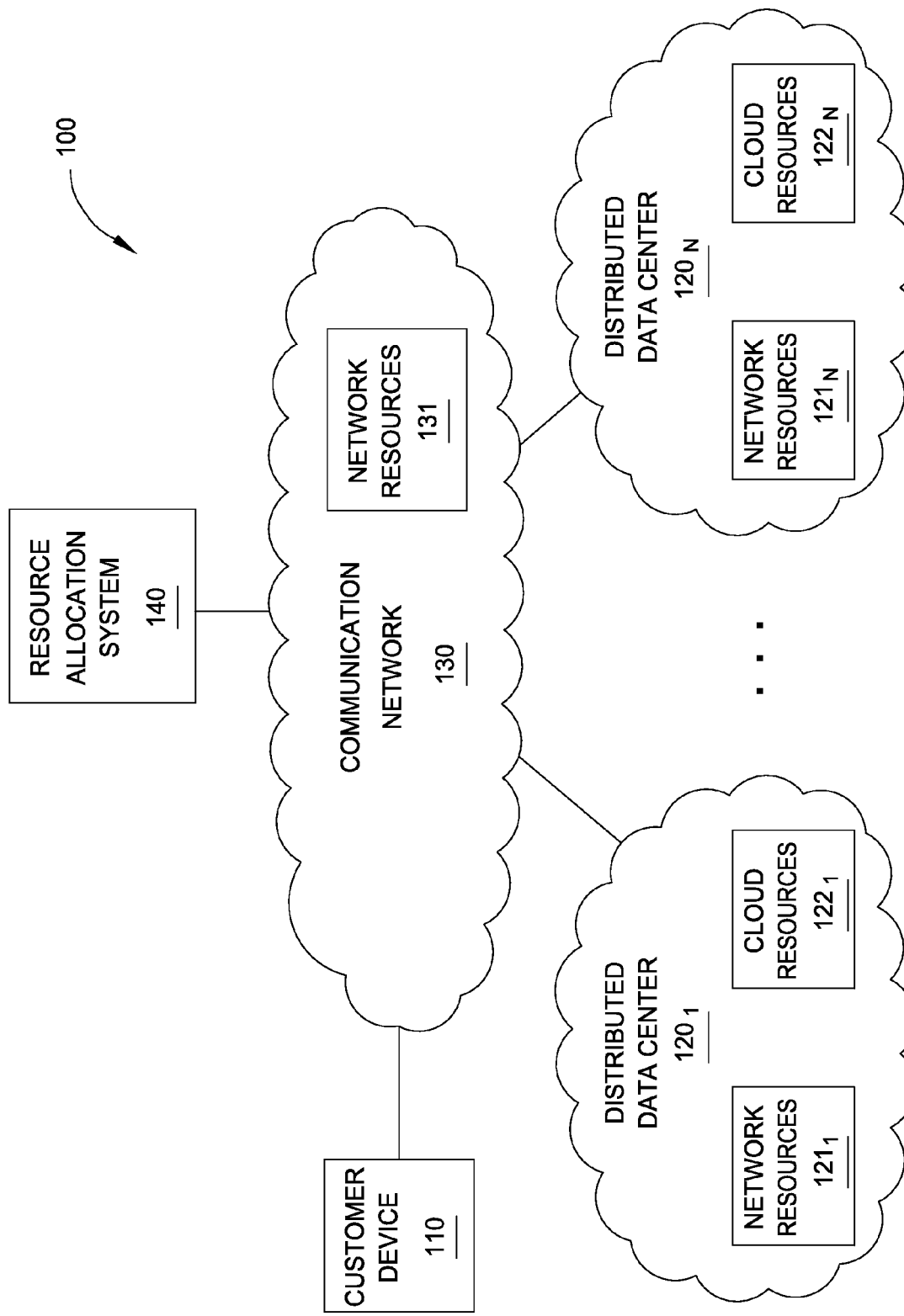
FIG. 1 depicts a high-level block diagram of a communication system including a distributed cloud system of a cloud provider.

FIG. 1 depicts a high-level block diagram of a communication system including a distributed cloud system of a cloud provider.

The communication system 100 includes a customer device 110, a plurality of distributed data centers $120_1$-$120_N$ (collectively, distributed data centers 120), a communication network 130, and a resource allocation system 140.

The distributed data centers 120 and the communication network 130 cooperate to provide a distributed cloud system. The distributed cloud system may be used by customer device 110 or one or more other customer devices (omitted for purposes of clarity). The distributed cloud system may support one or more cloud services (e.g., cloud-based applications, cloud-based file systems, virtual resources, or the like, as well as various combinations thereof) which may be used by customer device 110 or one or more other customer devices. The distributed cloud system may be operated by a cloud provider, which may be a network service provider (e.g., a provider that has direct control over communication network 130), a cloud service provider (e.g., a provider that does not have direct control over communication network 130), or the like. The typical configuration and operation of a distributed cloud system will be understood by one skilled in the art.

The customer device 110 may be configured to send a request for an allocation of resources of the distributed cloud system provided by the distributed data centers 120 and the communication network 130. The customer device 110 may be configured to direct the request for the allocation of resources of the distributed cloud system to the resource allocation system 140. The customer device 110 may request an allocation of resources to be used by customer device 110 or one or more other customer devices which may be associated with any of the distributed data centers 120 or the communication network 130 (which are omitted for purposes of clarity). For example, customer device 110 may be a desktop computer, a laptop computer, a tablet computer, a smart phone, a server, a server blade, or any other type of device configured to request an allocation of resources of a distributed cloud system.

The distributed data centers 120 may be distributed geographically. The distributed data centers 120 may be located at any suitable geographic locations. The distributed data centers 120 may be distributed across a geographic area of any suitable size (e.g., globally, on a particular continent, within a particular country, within a particular portion of a country, or the like). The distributed data centers 120 may be located relatively close to the users (where the user devices expected to access the distributed data centers 120 have been omitted for purposes of clarity). For example, where the cloud provider may be a network service provider, at least a portion of the distributed data centers 120 may be implemented within Central Offices (COs) of the network service provider. It will be understood that, as traditional telecommunications equipment deployed in the COs has become more compact, real estate has become available at the COs and may be used for deployment of servers configured to operate as part of a distributed cloud system. It also will be understood that such COs generally tend to be highly networked, such that they may be configured to support the additional traffic associated with a distributed cloud system. It will be appreciated that at least a portion of the distributed data centers 120 may be located relatively close to each other geographically.

The distributed data centers 120 each include network resources 121 (illustratively, network resources $121_1$-$121_N$ of distributed data centers $120_1$-$120_N$, respectively). The network resources 121 of a distributed data center 120 may include network resources configured to support communications within the distributed data center 120 (e.g., between virtual machines (VMs) within the distributed data center) as well as between elements of the distributed data center (e.g., VMs) and elements located outside of the distributed data center 120. For example, the network resources 121 of a distributed data center 120 may include network elements (e.g., host servers, top-of-rack (ToR) switches, aggregating switches, routers, or the like), communication links, or the like, as well as various combinations thereof. The network resources 121 also may include network resources which may be requested by a user and which may be allocated for use in supporting communications of the distributed data center 120 (e.g., bandwidth or other suitable types of network resources).

The distributed data centers 120 each include cloud resources 122 (illustratively, cloud resources $122_1$-$122_N$ of distributed data centers $120_1$-$120_N$, respectively). The cloud resources 122 each may include one or more of computing resources, memory resources, storage resources, or the like, as well as various combinations thereof. For example, the cloud resources 122 may support VMs, cloud-based file systems, cloud-based applications, or the like, as well as various combinations thereof. The types of cloud resources 122 which may be made available from a distributed data center 120, as well as the various potential uses of such cloud resources 122, will be understood by one skilled in the art.

The distributed data centers 120 are configured to communicate with each other via communication network 130. The distributed data centers 120 may communicate with each other for purposes of supporting one or more cloud services utilized by the customer (e.g., by customer device 110 or one or more other customer devices associated with the customer). For example, VMs instantiated in distributed data centers 120 may communicate with each other within the context of one or more cloud services being used by a user(s) of the customer for which the VMs are instantiated.

The communication network 130 supports communication between various elements of the distributed cloud system (e.g., between the distributed data centers 120, including between cloud resources 122 of the distributed data centers 120). The communication network 130 includes network resources 131. The network resources 131 may include network resources configured to support communication between the distributed data centers 120 (e.g., between the cloud resources 122 of the distributed data centers 120). For example, the network resources 131 may include networks, network elements, communication links, or the like, as well as various combinations thereof. The network resources 131 also may include network resources which may be requested by the customer and which may be allocated for use in supporting communication between cloud resources 122 allocated to the customer (e.g., bandwidth or other suitable types of network resources).

The resource allocation system 140 may be configured to receive a resource allocation request from a customer (illustratively, from customer device 110) and determine a resource allocation for the customer in response to the resource allocation request received from the customer. The resource allocation request includes one or more customer constraints to be satisfied for the resource allocation for the customer. The resource allocation request also may include a customer goal for the customer (or may be used by the resource allocation system 140 in order to identify a customer goal for the customer). The resource allocation system 140 is configured to determine the resource allocation in response to the resource request based on the one or more customer constraints, the customer goal, and a cloud provider goal of the cloud provider. The operation of the resource allocation system 140 in determining a resource allocation based on the one or more customer constraints, the customer goal, and the cloud provider goal may be better understood by way of reference to FIG. 2.

The resource allocation system 140 may be configured to control provisioning of resources based on the resource allocation that is determined by the resource allocation system 140 in response to the resource allocation request from the customer. The resource allocation system 140 may be configured to communicate with one or more of the distributed data centers 120 for controlling allocation of cloud resources 122 (and, optionally, network resources 121) based on the resource allocation that is determined by the resource allocation system 140. The resource allocation system 140 may be configured to communicate with one or more elements of the communication network 130 for controlling allocation of network resources 131 based on the resource allocation that is determined by the resource allocation system 140 (e.g., provisioning bandwidth between various ones of the distributed data centers 120).

The resource allocation system 140 may be configured to provide various other functions as depicted and described herein.

Figure 2:
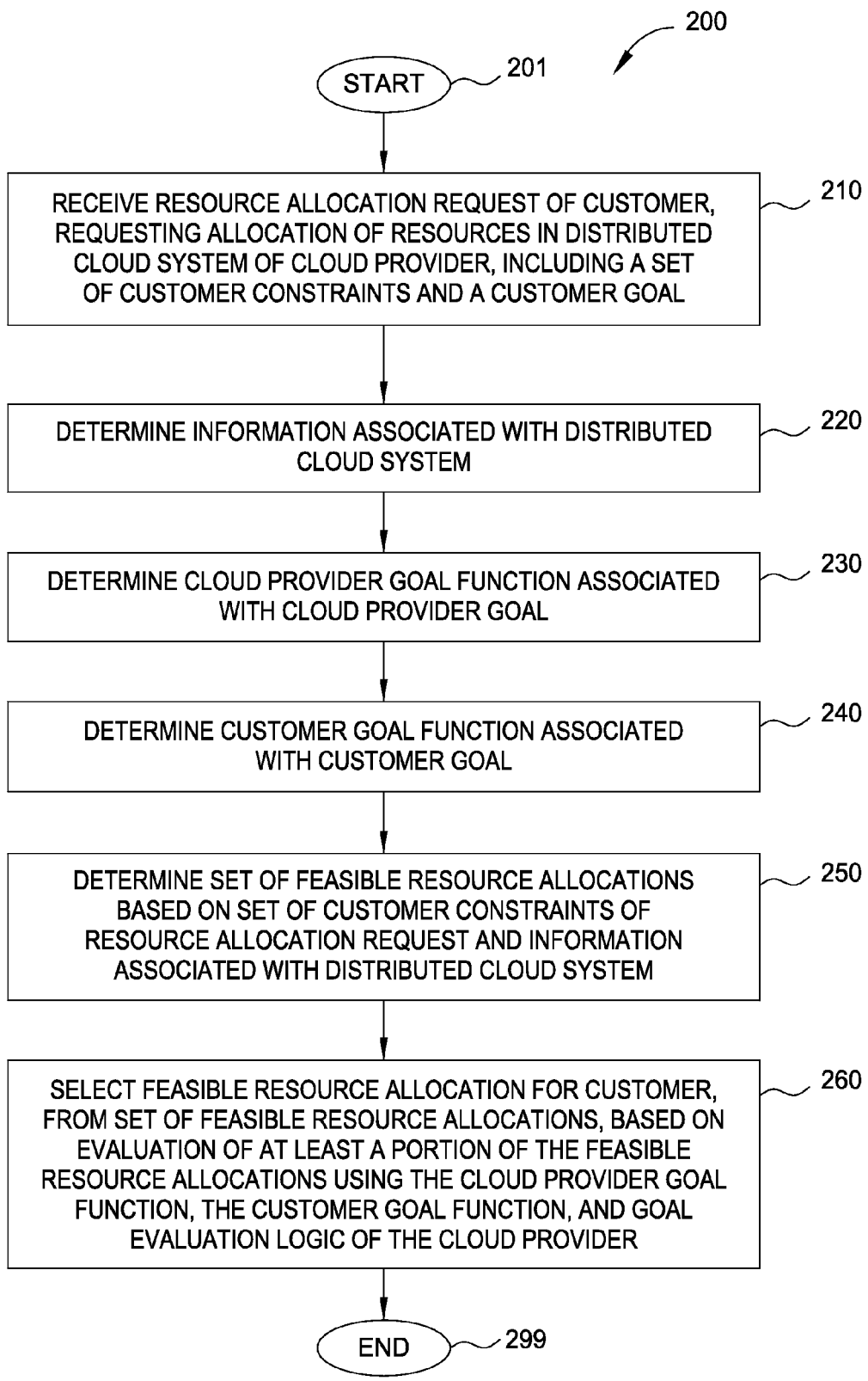
FIG. 2 depicts an exemplary embodiment of a method for determining a resource allocation for a customer of the cloud provider of the distributed cloud system of FIG. 1.

FIG. 2 depicts an exemplary embodiment of a method for determining a resource allocation for a customer of the cloud provider of the distributed cloud system of FIG. 1. It will be appreciated that, although primarily depicted and described as being performed serially, at least a portion of the steps of method 200 may be performed contemporaneously or in a different order than presented in FIG. 2.

At step 201, method 200 begins.

At step 210, a resource allocation request of the customer is received. The resource allocation request includes a set of customer constraints of the customer and a customer goal of the customer (although it will be appreciated that, in at least some embodiments, the customer goal of the customer may be determined based on receipt of the resource allocation request, rather than being included within the resource allocation request).

The set of customer constraints includes one or more requirements of the customer for the requested resources. For example, the set of customer constraints may include identification of cloud resources requested by the customer (e.g., the type(s) of cloud resources, the amount(s) of cloud resources, the location(s) of cloud resources, or the like). For example, the set of customer constraints may include identification of network resources requested by the customer (e.g., amount of bandwidth requested or one or more other types of network resources). For example, the set of customer constraints may include a number of VMs requested, a total amount of memory to be provided for the VMs, required geographic locations at which at least some VMs are to be hosted, specific types of hypervisors to be used to support the VMs, communication QoS requirements, or the like, as well as various combinations thereof.

The customer goal may be an objective (e.g., feature, result, or the like) desired, but not necessarily required, by the customer. For example, a customer goal may be minimizing a cost of the resource allocation, minimizing communication delay (e.g., minimizing average inter-VM delay), minimizing an environmental impact due to use of the resource allocation, or the like. In at least some embodiments, the resource allocation request of the customer also may include a customer goal function for the customer goal, where the customer goal function specifies the manner in which satisfaction of the customer goal may be evaluated (e.g., a manner in which a score for the customer goal may be computed).

At step 220, information associated with the distributed cloud system is determined.

The information associated with the distributed cloud system may include any information which may be used to determine a mapping of a resource allocation request to the distributed cloud system. For example, the information associated with the distributed cloud system may include one or more of identification of sites that include resources of the distributed cloud system, geographic location information identifying geographic locations of the sites including resources of the distributed cloud system, identification of resources available at the sites that include resources of the distributed cloud system (e.g., numbers of VMs available, amount of memory resources available, or the like), network topology information for intra-site communications within respective sites that include resources of the distributed cloud system (e.g., mappings of VMs to hosts, hypervisors associated with hosts, arrangement of ToR switches, arrangement of aggregating switches, arrangement of routers, or the like), network topology information for inter-site communications between respective sites that include resources of the distributed cloud system, or the like, as well as various combinations thereof.

The information associated with the distributed cloud system also may include a cloud provider goal of the cloud provider of the distributed cloud system. The cloud provider goal may be an objective (e.g., feature, result, or the like) desired, but not necessarily required, by the cloud provider. For example, the cloud provider goal may be minimizing a cost of the supporting a resource allocation for the customer, maximizing a satisfaction level of the customer, minimizing the blocking of resources of a resource type, minimizing an environmental impact due to supporting a resource allocation for the customer, or the like. The information associated with the distributed cloud system also may include a cloud provider goal function for the cloud provider goal, where the cloud provider goal function specifies the manner in which satisfaction of the cloud provider goal may be evaluated (e.g., a manner in which a score for the cloud provider goal may be computed).

At step 230, a cloud provider goal function associated with a cloud provider goal is determined.

The cloud provider goal function may be configured to be applied to a feasible resource allocation in order to determine a level of satisfaction of the associated cloud provider goal if the feasible resource allocation is selected for and used by the customer.

The determination of the cloud provider goal function may include identifying the cloud provider goal and then determining the cloud provider goal function associated with the cloud provider goal. The cloud provider goal may be identified from the information associated with the distributed cloud system or from any other suitable source of a cloud provider goal (e.g., cloud provider policy information or the like). Similarly, the cloud provider goal function may be determined from the information associated with the distributed cloud system or from any other suitable source of a cloud provider goal function (e.g., cloud provider policy information or the like).

In at least some embodiments, the cloud provider goal may be one of a plurality of cloud provider goals of the cloud provider. In at least some embodiments, in which the cloud provider has multiple cloud provider goals associated therewith, the cloud provider goal may be identified or selected based on one or more factors (e.g., the customer from which the resource allocation request is received, the customer goal specified in the resource allocation request, or the like, as well as various combinations thereof).

In at least some embodiments, the cloud provider goal function may be one of a plurality of cloud provider goal functions associated with the cloud provider goal of the cloud provider. In at least some embodiments, in which the cloud provider goal has multiple cloud provider goal functions associated therewith, the cloud provider goal function may be determined or selected based on one or more factors (e.g., the customer from which the resource allocation request is received, the customer goal specified in the resource allocation request, or the like, as well as various combinations thereof). An example of a cloud provider goal function for a cloud provider goal of minimizing the blocking of a resource type (e.g., bandwidth, processing capability, or the like) may include: avoid resource blocking—min_{all allocations} (max_{all resources} (utilized/available resource)) This exemplary cloud provider goal function also may be defined such that the sum of the values is minimized (rather than minimizing the maximum value).

At step 240, a customer goal function associated with the customer goal is determined.

The customer goal function may be configured to be applied to a feasible resource allocation in order to determine a level of satisfaction of the associated customer goal if the feasible resource allocation is selected for and used by the customer.

The customer goal function associated with the customer goal may be determined from the resource allocation request of the customer (e.g., where the customer goal function may be indicated or provided within the resource allocation request of the customer), from a customer profile of the customer that is maintained by or otherwise accessible to the cloud provider, or the like.

The customer goal function associated with the customer goal may be defined by the customer or the cloud provider. For example, the customer goal function may be defined by the customer prior to initiation of the resource allocation request and provided to the cloud provider for use in evaluating resource allocation requests specifying the customer goal with which the customer goal function is associated. For example, customer goal function may be defined by the cloud provider for use in evaluating resource allocation requests from the customer (and, optionally, for one or more other customers) that specify the customer goal with which the customer goal function is associated.

In at least some embodiments, the customer goal function may be one of a plurality of customer goal functions associated with the customer goal of the customer. In at least some embodiments, in which the customer goal has multiple customer goal functions associated therewith, the customer goal function may be determined or selected based on one or more factors (e.g., an intended use of the resources by the customer, a temporal factor, or the like, as well as various combinations thereof). An example of a customer goal function for a customer goal of minimizing the average inter-VM delay may include: minimize inter-VM average delay—min_{all allocations} (max_{all pairs of VMs in allocation that communicate with one another} delay. This exemplary customer goal function also may be defined such that the sum of the values is minimized (rather than minimizing the maximum value).

At step 250, a set of feasible resource allocations is determined based on the set of customer constraints of the resource allocation request and the information associated with the distributed cloud system.

The set of feasible resource allocations may include one or more feasible resource allocations. In at least some embodiments, a feasible resource allocation is an allocation of resources of the distributed system that satisfies the set of customer constraints of the resource allocation request. In at least some embodiments, a feasible resource allocation has associated therewith feasible resource allocation information which specifies a mapping of the resources requested by the customer to the distributed cloud system (e.g., geographic locations at which VMs are to be deployed, numbers of VMs deployed at the respective geographic locations, communication links to be established between VMs at the geographic locations, amount of memory to be allocated for the respective VMs to be deployed, or the like, as well as various combinations thereof).

It will be appreciated that there is a possibility that no feasible resource allocations will be identified in view of the information associated with the distributed cloud system and the one or more customer constraints of the resource allocation request. In at least one embodiment, if no feasible resource allocation is identified, the resource allocation request may be rejected (although it will be appreciated that the customer may then send a new resource allocation request specifying a new set of customer constraints which may be the same or different than the previous set of customer constraints). In at least one embodiment, if no feasible resource allocation is identified, the customer may be provided an option to modify one or more customer constraints of the set of customer constraints of the resource allocation request (e.g., by terminating method 200 and then re-executing method 200 based modified customer constraint(s) if the customer submits modified customer constraints, by adapting method 200 to continue to execute pending a determination as to whether or not the customer submits modified customer constraints, or the like). Thus, it will be appreciated that such scenarios may be handled within or outside of the context of method 200 of FIG. 2.

It also will be appreciated that, given the various options for mapping the customer service request to the distributed cloud system, many feasible configurations may be identified.

In method 200 of FIG. 2, for purposes of clarity, it is assumed that the set of feasible resource allocations includes at least one feasible resource allocation such that the resource allocation request of the customer may be served by the cloud provider.

At step 260, a feasible resource allocation is selected for the customer, from the set of feasible resource allocations, based on the evaluation of at least a portion of the feasible resource allocations using the cloud provider goal function, the customer goal function, and goal evaluation logic of the cloud provider. Exemplary embodiments for selecting a feasible resource allocation for the customer, based on the evaluation of at least a portion of the feasible resource allocations using the cloud provider goal function, the customer goal function, and the goal evaluation logic of the cloud provider, are depicted and described with respect to FIGS. 3-5.

At step 299, method 200 ends.

Figure 3:
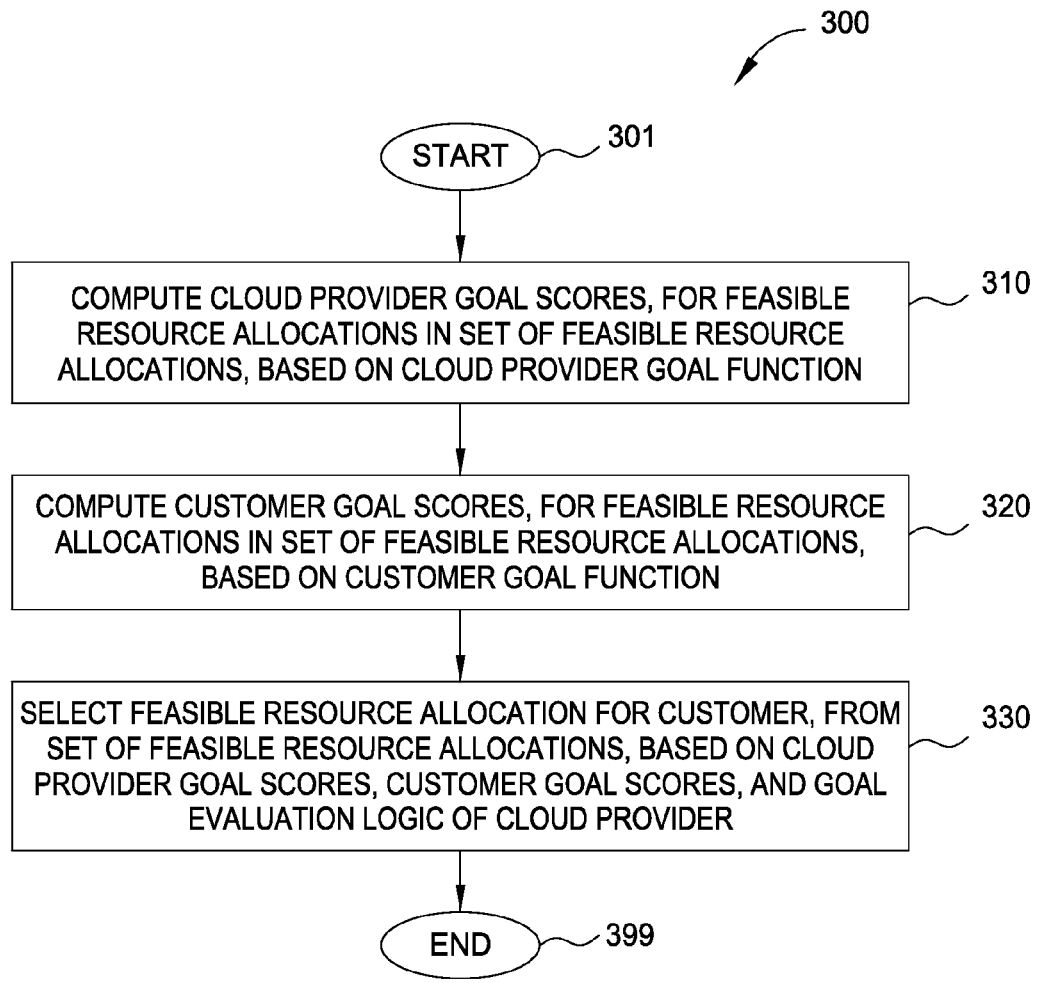
FIG. 3 depicts an exemplary embodiment of a method for selecting a feasible resource allocation for a customer using a cloud provider goal function and a customer goal function.

FIG. 3 depicts an exemplary embodiment of a method for selecting a feasible resource allocation for a customer using a cloud provider goal function and a customer goal function. In at least some embodiments, method 300 of FIG. 3 may be used to provide step 260 of method 200 of FIG. 2. It will be appreciated that, although primarily depicted and described as being performed serially, at least a portion of the steps of method 300 may be performed contemporaneously or in a different order than presented in FIG. 3.

At step 301, method 300 begins.

At step 310, cloud provider goal scores are computed for the feasible resource allocations in the set of feasible resource allocations based on the cloud provider goal function. For each feasible resource allocation in the set of feasible resource allocations, the cloud provider goal function is evaluated in order to compute a cloud provider goal score indicative as to a level at which the feasible resource allocation satisfies the cloud provider goal. The cloud provider goal score computed for a given feasible resource allocation may be computed based on the respective feasible resource allocation information associated with the feasible resource allocation.

At step 320, customer goal scores are computed for the feasible resource allocations in the set of feasible resource allocations based on the customer goal function. For each feasible resource allocation in the set of feasible resource allocations, the customer goal function is evaluated in order to compute a customer goal score indicative as to a level at which the feasible resource allocation satisfies the customer goal. The customer goal score computed for a given feasible resource allocation may be computed based on the respective feasible resource allocation information associated with the feasible resource allocation.

At step 330, a feasible resource allocation is selected for the customer, from the set of feasible resource allocations, based on the cloud provider goal scores and the customer goal scores.

At step 399, method 300 ends.

Figure 4:
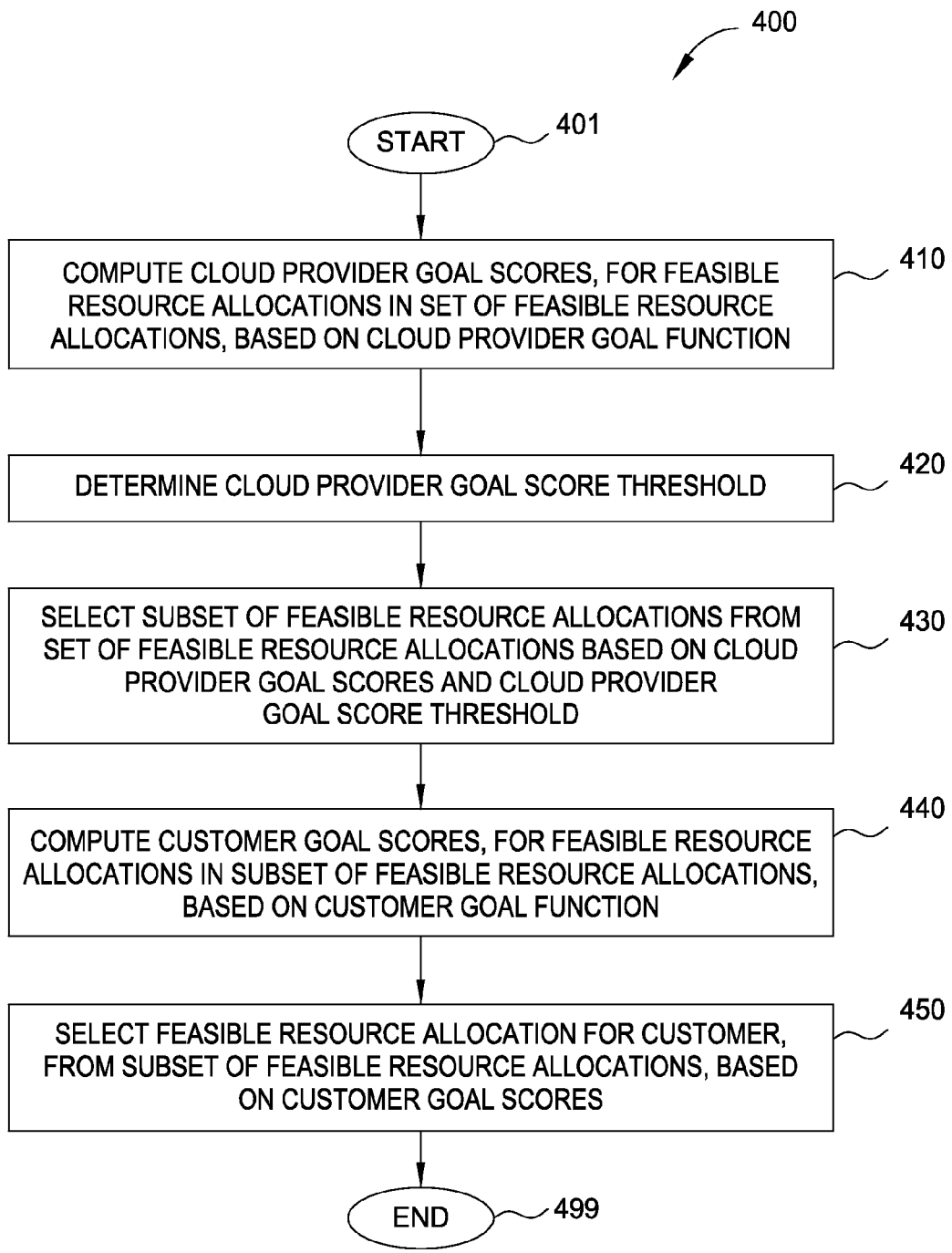
FIG. 4 depicts an exemplary embodiment of a method for selecting a feasible resource allocation for a customer using a cloud provider goal function and a customer goal function.

FIG. 4 depicts an exemplary embodiment of a method for selecting a feasible resource allocation for a customer using a cloud provider goal function and a customer goal function. In at least some embodiments, method 400 of FIG. 4 may be used to provide step 260 of method 200 of FIG. 2. It will be appreciated that, although primarily depicted and described as being performed serially, at least a portion of the steps of method 400 may be performed contemporaneously or in a different order than presented in FIG. 4.

At step 401, method 400 begins.

At step 410, cloud provider goal scores are computed for the feasible resource allocations in the set of feasible resource allocations based on the cloud provider goal function. For each feasible resource allocation in the set of feasible resource allocations, the cloud provider goal function is evaluated in order to compute a cloud provider goal score indicative as to a level at which the feasible resource allocation satisfies the cloud provider goal. The cloud provider goal score computed for a given feasible resource allocation may be computed based on the respective feasible resource allocation information associated with the feasible resource allocation.

At step 420, a cloud provider goal score threshold is determined. The cloud provider goal score threshold may be determined based on the cloud provider goal or the cloud provider goal function. The cloud provider goal score threshold may be determined from the information associated with the distributed cloud system or from any other suitable source of a cloud provider goal score threshold (e.g., cloud provider policy information or the like).

At step 430, a subset of feasible resource allocations is selected from the set of feasible resource allocations based on the cloud provider goal scores and the cloud provider goal score threshold. The selected subset of feasible resource allocations may include feasible resource allocations having cloud provider goal scores satisfying the cloud provider goal score threshold.

It will be appreciated that while an assumption is made, for purposes of clarity, that not all of the feasible resource allocations will have associated cloud provider goal scores satisfying the cloud provider goal score threshold, it is possible that all of the feasible resource allocations will have associated cloud provider goal scores satisfying the cloud provider goal score threshold, in which case method 400 of FIG. 4 becomes similar to the operation of method 300 of FIG. 3 (e.g., customer goal scores are computed for each of the feasible resource allocations in the set of feasible resource allocations and one of the feasible resource allocations is selected for the customer, from the set of feasible resource allocations, based on the cloud provider goal scores and the customer goal scores).

It will be appreciated that while an assumption is made, for purposes of clarity, that at least one of the feasible resource allocations has an associated cloud provider goal score satisfying the cloud provider goal score threshold, it is possible that none of the feasible resource allocations will have an associated cloud provider goal score satisfying the cloud provider goal score threshold. In at least some embodiments, if a determination is made that none of the feasible resource allocations has an associated cloud provider goal score satisfying the cloud provider goal score threshold, the cloud provider goal score threshold may be relaxed and either (1) method 400 may be re-executed using the relaxed cloud provider goal score threshold or (2) method 400 may be continue to operate and step 430 may be repeated using the relaxed cloud provider goal score threshold.

At step 440, customer goal scores are computed for the feasible resource allocations in the subset of feasible resource allocations based on the customer goal function. For each feasible resource allocation in the subset of feasible resource allocations, the customer goal function is evaluated in order to compute a customer goal score indicative as to a level at which the feasible resource allocation satisfies the customer goal. The customer goal score computed for a given feasible resource allocation may be computed based on the respective feasible resource allocation information associated with the feasible resource allocation.

At step 450, a feasible resource allocation is selected for the customer, from the subset of feasible resource allocations, based on the customer goal scores. The selection of the feasible resource allocation also may be based on the cloud provider goal scores and goal evaluation logic of the cloud provider.

At step 499, method 400 ends.

Figure 5:
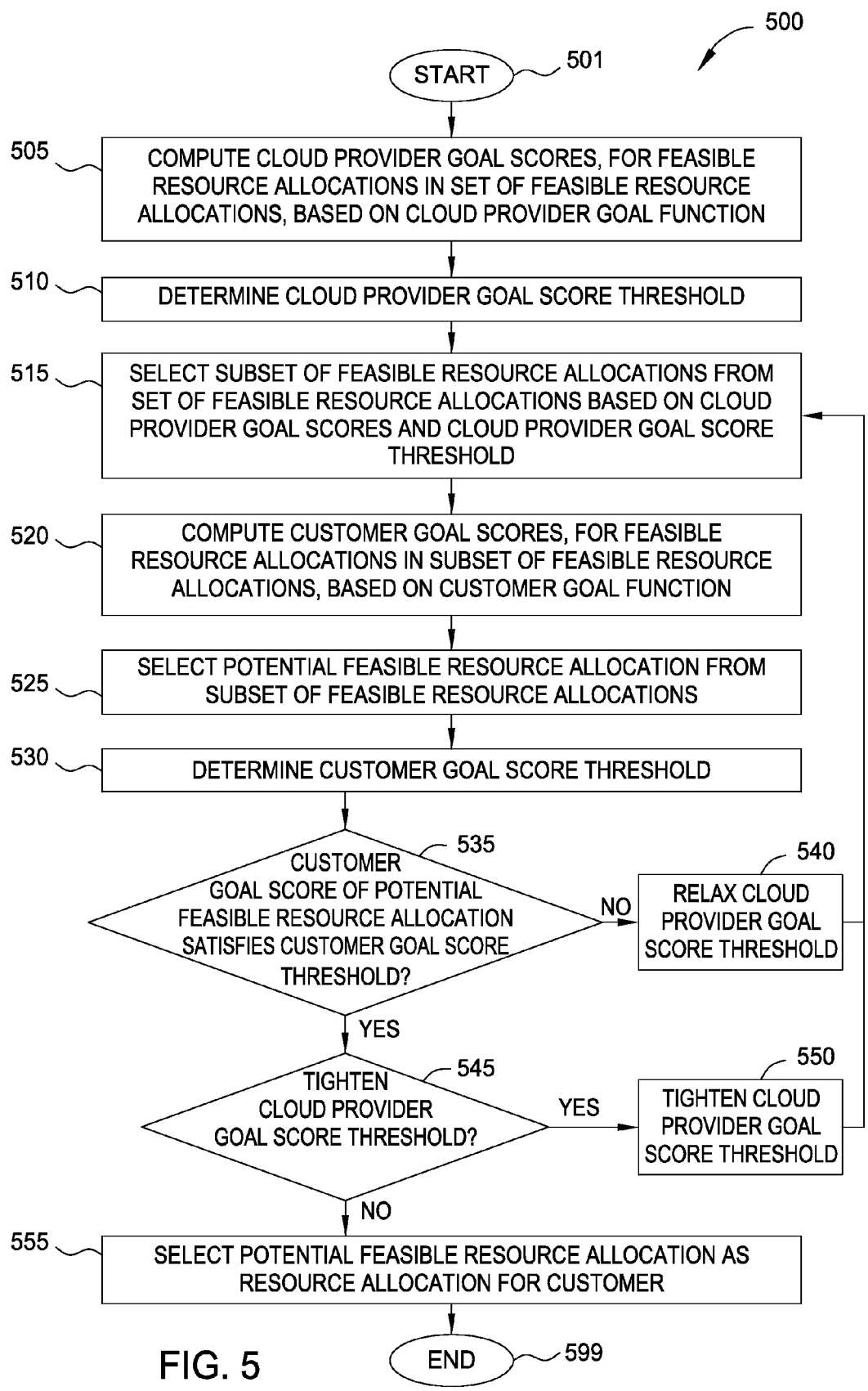
FIG. 5 depicts an exemplary embodiment of a method for selecting a feasible resource allocation for a customer using a cloud provider goal function and a customer goal function.

FIG. 5 depicts an exemplary embodiment of a method for selecting a feasible resource allocation for a customer using a cloud provider goal function and a customer goal function. In at least some embodiments, method 500 of FIG. 5 may be used to provide step 260 of method 200 of FIG. 2. It will be appreciated that, although primarily depicted and described as being performed serially, at least a portion of the steps of method 500 may be performed contemporaneously or in a different order than presented in FIG. 5.

At step 501, method 500 begins.

At step 505, cloud provider goal scores are computed for the feasible resource allocations in the set of feasible resource allocations based on the cloud provider goal function.

At step 510, a cloud provider goal score threshold is determined. The cloud provider goal score threshold may be determined based on the cloud provider goal or the cloud provider goal function. The cloud provider goal score threshold may be determined from the information associated with the distributed cloud system or from any other suitable source of a cloud provider goal score threshold (e.g., cloud provider policy information or the like).

At step 515, a subset of feasible resource allocations is selected from the set of feasible resource allocations based on the cloud provider goal scores and the cloud provider goal score threshold. The selected subset of feasible resource allocations may include feasible resource allocations having cloud provider goal scores satisfying the cloud provider goal score threshold. As described with respect to step 430 of FIG. 4, it will be appreciated that, for purposes of clarity, an assumption is made that at least one, but not all, of the feasible resource allocations will have associated cloud provider goal scores satisfying the cloud provider goal score threshold.

At step 520, customer goal scores are computed for the feasible resource allocations in the subset of feasible resource allocations based on the customer goal function. For each feasible resource allocation in the subset of feasible resource allocations, the customer goal function is evaluated in order to compute a customer goal score indicative as to a level at which the feasible resource allocation satisfies the customer goal. The customer goal score computed for a given feasible resource allocation may be computed based on the respective feasible resource allocation information associated with the feasible resource allocation.

At step 525, a potential feasible resource allocation is selected from the subset of feasible resource allocations. The potential feasible resource allocation is the feasible resource allocation, from the subset of feasible resource allocations, having the best customer goal score. It will be appreciated that, although omitted for purposes of clarity, there may be multiple feasible resource allocations having the same best customer goal score, such that this step also may be considered to be selection of a set of potential resource allocations from the subset of feasible resource allocations (where the set of potential resource allocations may include one or more potential feasible resource allocations). Similarly, it will be appreciated that, although omitted for purposes of clarity, there may be multiple feasible resource allocations having the customer goal scores satisfying the customer goal score threshold, in which case this step also may be considered to be selection of a set of potential resource allocations from the subset of feasible resource allocations. It will be further appreciated that, although omitted for purposes of clarity, in at least some embodiments in which a set of potential resource allocations from the subset of feasible resource allocations includes multiple potential resource allocations, method 500 may include one or more steps for selecting one of the potential resource allocations before determining whether to relax or tighten the cloud provider goal score threshold or whether the selected one of the potential resource allocations is ultimately selected for use by the customer as described with respect to step 555.

At step 530, a customer goal score threshold is determined. The customer goal score threshold may be set by the cloud provider. The customer goal score threshold may be determined based on one or more of the customer goal, the customer goal function, the cloud provider goal, or the cloud provider goal function. The customer goal score threshold may be determined from the information associated with the distributed cloud system or from any other suitable source of a customer goal score threshold (e.g., cloud provider policy information or the like).

At step 535, a determination is made as to whether the customer goal score of the potential feasible resource allocation satisfies the customer goal score threshold. If a determination is made that the customer goal score of the potential feasible resource allocation does not satisfy the customer goal score threshold, method 500 proceeds to step 540. If a determination is made that the customer goal score of the potential feasible resource allocation satisfies the customer goal score threshold, method 500 proceeds to step 545.

At step 540, the cloud provider goal score threshold is relaxed in a manner tending to increase the number of feasible resource allocations for which customer goal scores are computed, which may include decreasing or increasing the cloud provider goal score threshold depending on whether a higher or lower cloud provider goal score is preferred. From step 540, method 500 returns to step 515 such that steps 515-535 may be repeated based on the modified cloud provider goal score threshold.

At step 545, a determination is made as to whether or not to tighten the cloud provider goal score threshold in a manner tending to decrease the number of feasible resource allocations for which customer goal scores are computed, which may include decreasing or increasing the cloud provider goal score threshold depending on whether a higher or lower cloud provider goal score is preferred. This determination may be made based on the goal evaluation logic of the cloud provider. It is noted that tightening of the cloud provider goal score threshold in this manner gives the cloud provider a capability to improve its achievement of its cloud provider goal while still satisfying the customer goal of the customer. It is noted that the use of one or more such iterations enables the cloud provider to approach its cloud provider goal while still ensuring that the customer goal of the customer is adequately satisfied. If a decision is made to tighten the cloud provider goal score threshold, method 500 proceeds to step 550. If a decision is made not to tighten the cloud provider goal score threshold, method 500 proceeds to step 555.

At step 550, the cloud provider goal score threshold is tightened in a manner tending to decrease the number of feasible resource allocations for which customer goal scores are computed, which may include decreasing or increasing the cloud provider goal score threshold depending on whether a higher or lower cloud provider goal score is preferred. From step 550, method 500 returns to step 515 such that steps 515-535 may be repeated based on the modified cloud provider goal score threshold.

At step 555, the potential feasible resource allocation is selected as the resource allocation for the customer.

At step 599, method 500 ends.

In at least some embodiments, as discussed at least with respect to FIGS. 2-5, the cloud provider may select the feasible resource allocation for the customer based on goal evaluation logic of the cloud provider, which may include one or more of one or more policies of the cloud provider, one or more processing rules, or the like, as well as various combinations thereof.

For example, goal evaluation logic of the cloud provider may specify that the optimal customer goal score is to be used irrespective of the associated cloud provider goal score for that feasible resource allocation (e.g., the cloud provider is willing to sacrifice at least a portion of its own goal in order to optimize or improve satisfaction of the customer goal of the customer). For example, where three feasible resource allocations are identified and the three feasible resource allocations have respective cloud provider goal scores of 10, 20, and 25 and customer goal scores of 30, 30, and 20 with greater numbers being preferred, application of the goal evaluation logic results in selection of the third feasible resource allocation in order to provide the maximum cloud provider goal score of 25 at the expense of providing the minimum customer goal score of 20.

For example, goal evaluation logic of the cloud provider may specify that the optimal cloud provider goal score is to be used irrespective of the associated customer goal score for that feasible resource allocation (e.g., the cloud provider is unwilling to sacrifice its own goal in order to satisfy the customer goal of the customer). For example, where three feasible resource allocations are identified and the three feasible resource allocations have respective cloud provider goal scores of 10, 20, and 25 and customer goal scores of 40, 30, and 20 with greater numbers being preferred, application of the goal evaluation logic results in selection of the first feasible resource allocation in order to provide the maximum customer goal score of 40 at the expense of providing the minimum cloud provider goal score of 10.

For example, goal evaluation logic of the cloud provider may specify that a balance is to be struck between achieving the optimal customer goal score and the optimal cloud provider goal score. For example, this goal evaluation logic may specify that an optimal customer goal score is to be used as long as the associated cloud provider goal score satisfies a threshold and, further, that certain amount of reduction in the cloud provider goal score (e.g., reduction below the threshold) is acceptable as long as a certain amount of increase in the customer goal score is achieved as a result. For example, consider an example in which goal evaluation logic specifies that a cloud provider goal score threshold is 100, but that a decrease of 10 in the cloud provider goal score is acceptable as long as a corresponding increase of at least 15 is achieved in the customer goal score. In this example, where three feasible resource allocations are identified and the three feasible resource allocations have respective cloud provider goal scores of 90, 100, and 115 and customer goal scores of 80, 60, and 20 with greater numbers being preferred, application of the goal evaluation logic results in selection of the first feasible resource allocation rather than second feasible resource allocation (even though the cloud provider goal scores of 90 for the second feasible resource allocation is below the cloud provider goal score threshold), because accepting a decrease of 10 in the cloud provider goal score results in an increase of 20 in the customer goal score.

It will be appreciated that various other types of goal evaluation logic (e.g., policies, processing rules, or the like) may be used for evaluating cloud provider goal scores and customer goal scores.

It will be appreciated that, although omitted for purposes of clarity, execution of any of the methods 200-500 of FIGS. 2-5 may include or may trigger initiation of one or more management functions based on the feasible resource allocation that is selected for the customer. The one or more management functions may include initiating configuration of the distributed cloud system to support the feasible resource allocation selected for the customer, propagating an indication of the selected feasible resource allocation toward the customer, or the like, as well as various combinations thereof.

It will be appreciated that, although omitted for purposes of clarity, execution of any of the methods 200-500 of FIGS. 2-5 may result in a situation in which a feasible resource allocation is not or cannot be selected for the customer. In at least some embodiments, in which one or more feasible resource allocations are identified, but evaluation of the customer goal and the cloud provider goal in view of the goal evaluation logic of the cloud provider results in which none of the feasible resource allocations are selected for the customer, one or more actions may be initiated. The one or more actions may include re-executing the associated method(s) to attempt to select a feasible resource allocation for the customer (e.g., based on one or more of relaxation of a customer goal, relaxation of a customer goal score threshold, use of a different customer goal function, relaxation of a cloud provider goal, relaxation of a cloud provider goal score threshold, use of a different cloud provider goal function, use of different goal evaluation logic of the cloud provider, or the like), propagating a notification toward the customer for notifying the customer that a feasible resource allocation has not been selected (which also may include providing the customer with an option to re-request a resource allocation using a relaxed constraint(s) or a relaxed goal(s)), or the like.

It will be appreciated that, although primarily depicted and described herein with respect to embodiments in which the goal evaluation capability is provided within the context of a distributed cloud system for optimizing goals of a cloud service provider and a customer, embodiments of the goal evaluation capability may be adapted for use within other types of communication architectures (e.g., in a communication network for optimizing a goal of a communications service provider and goals of customers requesting services from the communication service provider).

It will be appreciated that, although primarily depicted and described herein with respect to embodiments in which the goal evaluation capability is provided within the context of communications systems, embodiments of the goal evaluation capability may be adapted for use within various other contexts in which there is interaction between a first party having a first goal associated therewith and a second party having a second goal associated therewith (e.g., in a service request by a customer to a service provider, in a business transaction between two parties, or the like).

Figure 6:
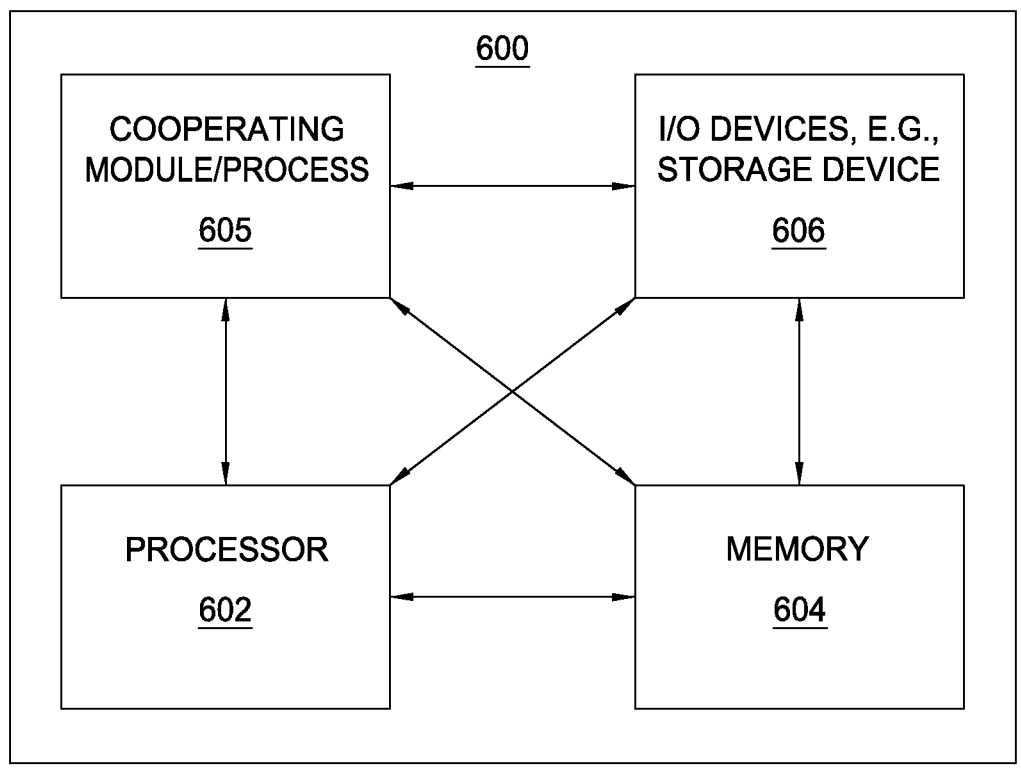
FIG. 6 depicts a high-level block diagram of a computer suitable for use in performing functions described herein.

FIG. 6 depicts a high-level block diagram of a computer suitable for use in performing functions described herein.

The computer 600 includes a processor 602 (e.g., a central processing unit (CPU) or other suitable processor(s)) and a memory 604 (e.g., random access memory (RAM), read only memory (ROM), and the like).

The computer 600 also may include a cooperating module/process 605. The cooperating process 605 can be loaded into memory 604 and executed by the processor 602 to implement functions as discussed herein and, thus, cooperating process 605 (including associated data structures) can be stored on a computer readable storage medium, e.g., RAM memory, magnetic or optical drive or diskette, and the like.

The computer 600 also may include one or more input/output devices 606 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 600 depicted in FIG. 6 provides a general architecture and functionality suitable for implementing functional elements described herein or portions of functional elements described herein. For example, the computer 600 provides a general architecture and functionality suitable for implementing one or more of customer device 110, a cloud resource 122 (e.g., a host server, a hypervisor, or the like), a network resource 121 (e.g., a ToR switch, an aggregating switch, or the like), network resources 131, or resource allocation system 140.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or" unless otherwise indicated (e.g., "or else" or "or in the alternative").

It will be appreciated that, while the foregoing is directed to various embodiments of features present herein, other and further embodiments may be devised without departing from the basic scope thereof.

What is claimed is:

1. An apparatus, comprising:
a processor and a memory communicatively connected to the processor, the processor configured to:
receive a resource allocation request of a customer, wherein the resource allocation request comprises a request for allocation of resources of a distributed system of a provider, a set of customer constraints, and a customer goal;
determine a set of feasible resource allocations for the customer based on the set of customer constraints and on information associated with the distributed system, the set of feasible resource allocations comprising a plurality of feasible resource allocations;
determine a provider goal function associated with a provider goal of the provider;
determine a customer goal function associated with the customer goal of the customer; and
select a feasible resource allocation for the customer from the set of feasible resource allocations based on the provider goal function and the customer goal function, wherein the processor is configured to select the feasible resource allocation for the customer by:
determining a set of provider goal scores comprising a plurality of provider goal scores for the respective plurality of feasible resource allocations based on the provider goal function; and
determining a set of customer goal scores comprising a plurality of customer goal scores for the respective plurality of feasible resource allocations based on the customer goal function; and
selecting one of the feasible resource allocations based on the set of provider goal scores, the set of customer goal scores, and goal evaluation logic of the provider.

2. The apparatus of claim 1, wherein the processor is configured to select the feasible resource allocation for the customer based on the set of provider goal scores, the set of customer goal scores, and the goal evaluation logic of the provider by:
selecting a subset of the feasible resource allocations of the set of feasible resource allocations based on the provider goal scores of the respective feasible resource allocations and a provider goal score threshold; and
selecting one of the feasible resource allocations, from the subset of feasible resource allocations, based on the customer goal scores of the respective subset of the feasible resource allocations and the goal evaluation logic of the provider.

3. The apparatus of claim 1, wherein the processor is configured to determine the provider goal function based on goal evaluation logic of the provider and to determine the customer goal function associated with the customer goal of the customer based on the resource allocation request of the customer.

4. An apparatus, comprising:
a processor and a memory communicatively connected to the processor, the processor configured to:
receive a resource allocation request of a customer, wherein the resource allocation request comprises a request for allocation of resources of a distributed system of a provider, a set of customer constraints, and a customer goal;
determine a set of feasible resource allocations for the customer based on the set of customer constraints and on information associated with the distributed system, the set of feasible resource allocations comprising a plurality of feasible resource allocations;
determine a provider goal function associated with a provider goal of the provider;
determine a customer goal function associated with the customer goal of the customer; and
select a feasible resource allocation for the customer from the set of feasible resource allocations based on the provider goal function and the customer goal function, wherein the processor is configured to select the feasible resource allocation for the customer by:
determining a set of provider goal scores comprising a plurality of provider goal scores for the respective plurality of feasible resource allocations based on the provider goal function; and
selecting a subset of the feasible resource allocations of the set of feasible resource allocations based on the provider goal scores of the respective feasible resource allocations and a provider goal score threshold.

5. The apparatus of claim 4, wherein the processor is configured to select the feasible resource allocation for the customer allocation by:
determining a set of customer goal scores comprising one or more customer goal scores for the respective subset of the feasible resource allocations based on the customer goal function; and
selecting one of the feasible resource allocations, from the subset of the feasible resource allocations, based on the one or more customer goal scores for the respective subset of feasible resource allocations and goal evaluation logic of the provider.

6. The apparatus of claim 4, wherein the subset of the feasible resource allocations comprises at least two feasible resource allocations, wherein the processor is configured to select one of the feasible resource allocations for the customer by:
   determining, based on the customer goal function, a set of customer goal scores comprising at least two customer goal scores for the respective at least two feasible resource allocations of the subset of the feasible resource allocations;
   selecting a set of potential feasible resource allocations from the subset of the feasible resource allocations based on the two or more customer goal scores for the respective subset of the feasible resource allocations and goal evaluation logic of the provider, the set of potential feasible resource allocations comprising one or more potential feasible resource allocations; and
   determining whether at least one of the customer goal scores of the respective one or more potential feasible resource allocations in the set of potential feasible resource allocations satisfies a customer goal score threshold of the customer.

7. The apparatus of claim 6, wherein the processor is configured to select the feasible resource allocation for the customer by:
   determining whether to relax or tighten the provider goal score threshold based on a result of the determination as to whether at least one of the customer goal scores of the respective one or more potential feasible resource allocations in the set of potential feasible resource allocations satisfies a customer goal score threshold of the customer.

8. The apparatus of claim 4, wherein the processor is configured to select the feasible resource allocation for the customer by:
   determining a set of customer goal scores comprising one or more customer goal scores for respective one or more feasible resource allocations in the subset of feasible resource allocations based on the customer goal function; and
   relaxing the provider goal score threshold based on a determination that the one or more customer goal scores in the set of customer goal scores do not satisfy a customer goal score threshold of the customer.

9. The apparatus of claim 4, wherein the processor is configured to select the feasible resource allocation for the customer by:
   determining a set of customer goal scores comprising one or more customer goal scores for respective one or more feasible resource allocations in the subset of feasible resource allocations based on the customer goal function; and
   tightening the provider goal score threshold based on a determination that at least one of the one or more customer goal scores in the set of customer goal scores satisfies a customer goal score threshold of the customer.

10. The apparatus of claim 4, wherein the processor is configured to determine the provider goal function based on goal evaluation logic of the provider and to determine the customer goal function associated with the customer goal of the customer based on the resource allocation request of the customer.

11. A method, comprising:
    using a processor and a memory for:
       receiving a resource allocation request of a customer, wherein the resource allocation request comprises a request for allocation of resources of a distributed system of a provider, a set of customer constraints, and a customer goal;
       determining a set of feasible resource allocations for the customer based on the set of customer constraints and on information associated with the distributed system, the set of feasible resource allocations comprising a plurality of feasible resource allocations;
       determining a provider goal function associated with a provider goal of the provider;
       determining a customer goal function associated with the customer goal of the customer; and
       selecting a feasible resource allocation for the customer from the set of feasible resource allocations based on the provider goal function and the customer goal function, wherein selecting the feasible resource allocation for the customer comprises:
          determining a set of provider goal scores comprising a plurality of provider goal scores for the respective plurality of feasible resource allocations based on the provider goal function;
          determining a set of customer goal scores comprising a plurality of customer goal scores for the respective plurality of feasible resource allocations based on the customer goal function; and
          selecting one of the feasible resource allocations based on the set of provider goal scores, the set of customer goal scores, and goal evaluation logic of the provider.

12. The method of claim 11, wherein selecting the feasible resource allocation for the customer based on the set of provider goal scores, the set of customer goal scores, and the goal evaluation logic of the provider comprises:
    selecting a subset of the feasible resource allocations of the set of feasible resource allocations based on the provider goal scores of the respective feasible resource allocations and a provider goal score threshold; and
    selecting one of the feasible resource allocations, from the subset of feasible resource allocations, based on the customer goal scores of the respective subset of the feasible resource allocations and the goal evaluation logic of the provider.

13. A method, comprising:
    using a processor and a memory for:
       receiving a resource allocation request of a customer, wherein the resource allocation request comprises a request for allocation of resources of a distributed system of a provider, a set of customer constraints, and a customer goal;
       determining a set of feasible resource allocations for the customer based on the set of customer constraints and on information associated with the distributed system, the set of feasible resource allocations comprising a plurality of feasible resource allocations;
       determining a provider goal function associated with a provider goal of the provider;
       determining a customer goal function associated with the customer goal of the customer; and
       selecting a feasible resource allocation for the customer from the set of feasible resource allocations based on the provider goal function and the customer goal function, wherein selecting the feasible resource allocation for the customer comprises:
          determining a set of provider goal scores comprising a plurality of provider goal scores for the respective plurality of feasible resource allocations based on the provider goal function; and selecting a subset of the feasible resource allocations of the set of feasible resource allocations based on the provider goal scores of the respective feasible resource allocations and a provider goal score threshold.

14. The method of claim 13, wherein selecting the feasible resource allocation for the customer comprises:

determining a set of customer goal scores comprising one or more customer goal scores for the respective subset of the feasible resource allocations based on the customer goal function; and selecting one of the feasible resource allocations, from the subset of the feasible resource allocations, based on the one or more customer goal scores for the respective subset of feasible resource allocations and goal evaluation logic of the provider.

15. The method of claim 13, wherein the subset of the feasible resource allocations comprises at least two feasible resource allocations, wherein selecting one of the feasible resource allocations for the customer comprises:

determining, based on the customer goal function, a set of customer goal scores comprising at least two customer goal scores for the respective at least two feasible resource allocations of the subset of the feasible resource allocations;

selecting a set of potential feasible resource allocations from the subset of the feasible resource allocations based on the two or more customer goal scores for the respective subset of the feasible resource allocations and goal evaluation logic of the provider, the set of potential feasible resource allocations comprising one or more potential feasible resource allocations; and determining whether at least one of the customer goal scores of the respective one or more potential feasible resource allocations in the set of potential feasible resource allocations satisfies a customer goal score threshold of the customer.

16. The method of claim 15, wherein selecting the feasible resource allocation for the customer comprises:

determining whether to relax or tighten the provider goal score threshold based on a result of the determination as to whether at least one of the customer goal scores of the respective one or more potential feasible resource allocations in the set of potential feasible resource allocations satisfies a customer goal score threshold of the customer.

17. The method of claim 13, wherein selecting the feasible resource allocation for the customer comprises:

determining a set of customer goal scores comprising one or more customer goal scores for respective one or more feasible resource allocations in the subset of feasible resource allocations based on the customer goal function; and relaxing the provider goal score threshold based on a determination that the one or more customer goal scores in the set of customer goal scores do not satisfy a customer goal score threshold of the customer.

18. The method of claim 13, wherein selecting the feasible resource allocation for the customer comprises:

determining a set of customer goal scores comprising one or more customer goal scores for respective one or more feasible resource allocations in the subset of feasible resource allocations based on the customer goal function; and tightening the provider goal score threshold based on a determination that at least one of the one or more customer goal scores in the set of customer goal scores satisfies a customer goal score threshold of the customer.

* * * * *